(12) United States Patent
Mackay (10) Patent No.: US 9,827,482 B2
(45) Date of Patent: Nov. 28, 2017

(54) SKATEBOARD DECK

(71) Applicant: Absolute International Pty Ltd, Queensland (AU)

(72) Inventor: Benjamin Alastair Mackay, Queensland (AU)

(73) Assignee: ABSOLUTE INTERNATIONAL PTY LTD, Queensland (AU)

( * ) Notice: Subject to any disclaimer, the term of this patent is extended or adjusted under 35 U.S.C. 154(b) by 0 days.

(21) Appl. No.: 15/204,328

(22) Filed: Jul. 7, 2016

(65) Prior Publication Data

US 2017/0007909 A1 Jan. 12, 2017

(30) Foreign Application Priority Data

Jul. 7, 2015 (AU) ................................ 2015902673

(51) Int. Cl.
| | | |
|---|---|---|
| *A63C 17/01* | (2006.01) | |
| *B29C 45/00* | (2006.01) | |
| *B29K 23/00* | (2006.01) | |
| *B29K 309/08* | (2006.01) | |
| *B29L 31/52* | (2006.01) | |

(52) U.S. Cl.
CPC ............ *A63C 17/01* (2013.01); *A63C 17/015* (2013.01); *A63C 17/017* (2013.01); *B29C 45/0005* (2013.01); *A63C 2203/42* (2013.01); *B29K 2023/12* (2013.01); *B29K 2309/08* (2013.01); *B29L 2031/52* (2013.01)

(58) Field of Classification Search
CPC ..... A63C 17/01; A63C 17/011; A63C 17/012; A63C 17/017; A63C 2203/42
See application file for complete search history.

(56) References Cited

U.S. PATENT DOCUMENTS

| | | | | |
|---|---|---|---|---|
| 4,029,330 A | * | 6/1977 | Runyan, Jr. ........ | A63C 17/0086 280/11.27 |
| 4,234,204 A | * | 11/1980 | Tibbals .................. | A63C 17/01 280/11.215 |
| 9,375,632 B1 | * | 6/2016 | Kish ..................... | A63C 17/012 |
| 2006/0049596 A1 | * | 3/2006 | Hill ........................ | A63C 17/01 280/87.042 |
| 2007/0252355 A1 | * | 11/2007 | Chen .................. | A63C 17/0033 280/87.042 |
| 2009/0108554 A1 | * | 4/2009 | Boyle .................... | A63C 17/01 280/87.042 |
| 2013/0001910 A1 | * | 1/2013 | Hsu ...................... | A63C 17/014 280/87.042 |
| 2016/0023088 A1 | * | 1/2016 | Aamodt ............... | A63C 17/012 280/11.28 |

\* cited by examiner

*Primary Examiner* — Brian Swenson
(74) *Attorney, Agent, or Firm* — Kilpatrick Townsend & Stockton LLP

(57) ABSTRACT

A skateboard deck comprising an elongate, fiber-reinforced thermoplastic injection molded body having top and bottom surfaces and including: a pair of spaced truck attachment bases integrally formed on the bottom surface and each associated with a respective end of said body; a substantially closed-loop, integral torsion member formed on the bottom surface of the body in a space between said truck attachment bases; and a pair of longitudinal stiffening ribs each formed integrally with the body, said truck attachment bases and said torsion member, said stiffening ribs and body being positively cambered whereby the body substantially flattens out under load in use.

19 Claims, 6 Drawing Sheets

SKATEBOARD DECK

FIELD OF THE INVENTION

This invention relates to a skateboard deck. This invention has particular application to a skateboard deck of the long board type, and for illustrative purposes the invention will be described with reference to this application. However we envisage that this invention may find use in other applications such as skateboard decks generally.

BACKGROUND OF THE INVENTION

The reference to any prior art in this specification is not, and should not be taken as, an acknowledgement or any form of suggestion that the referenced prior art forms part of the common general knowledge in Australia.

The art of skateboard design and manufacture is dominated by limitations on materials, techniques for their employment, and cost. Despite being superficially simple, skateboard decks need to be empirically engineered to control many variables, including overall shape, rails, torsional stiffness, controlled bend of the deck between the trucks, and weight. The considerations differ for boards styles as long boards or freeride longboards (usually about 36" (91 cm)) decks), as opposed to "standard" and long standard decks (about 22" to 27" (56-69 cm)).

Traditional deck construction used a laminated wood (plywood) blank shape, engineered with truck mounts fore and aft. Rails may be added for stiffness and edge protection during stunts and tricks. Nose and tail protectors may be added.

Australian Patent Publication AU 2012200377 B2 disclosed a new principal of construction using injection moulded engineering thermoplastics such as polypropylene to produce advanced standard and long-standard decks. A skateboard deck is provided having a unitary, plastic body having a bottom wall, a pair of raised truck attachment points spaced on the bottom wall, a pair of spaced stiffening ribs formed integrally with the body and extending between the front and rear truck mounting platforms and defining a cavity, and a closed loop, integral strengthening member formed in the deck and extending over the cavity.

The materials and methods of construction of the disclosed decks are not adaptable to longboard decks due to excess bending and torsional flex.

Composite longboard at 36" and greater in length utilizes techniques most commonly used in surfboard and sailboat manufacturing, such as using triaxial fiberglass cloth, high-density foam and epoxy resin. Foam may be multiblocked for shaping, such as being formed into hexagonal shapes. The form may then be encased in reinforcing fibre and resin or prepregs, and cured by appropriate technique. Typically the reinforcing may be triaxial fiberglass and the resin may be epoxy resin. The foam core may be supplemented by durable and resilient plastic rails placed in the nose and tail of the board to provide integrated protection from impact abuse. The boards are expensive to make. At the same time, variability can occur in the layup.

SUMMARY OF THE INVENTION

In a broad form the present invention seeks to provide a skateboard deck comprising an elongate, fibre-reinforced thermoplastic injection moulded body having top and bottom surfaces and including:

a pair of spaced truck attachment bases integrally formed on the bottom surface and each associated with a respective end of said body;

a substantially closed-loop, integral torsion member formed on the bottom surface of the body in a space between said truck attachment bases; and a pair of longitudinal stiffening ribs each formed integrally with the body, said truck attachment bases and said torsion member, said stiffening ribs and body being positively cambered whereby the body substantially flattens out under load in use.

Typically said body is at least 36" in length.

Typically said body is bounded by a periphery defining opposed side edge portions of the deck interconnected at their ends by respective nose and tail portions.

Typically said nose and tail portions are of different shapes.

Typically said nose portion has moulded-in wheel arch recesses, to accommodate the wheels in turns as the body rotates about a truck king pin.

Typically said truck attachment bases are built up and thickened relative to a standard board, whereby an integral cross section of attachment to the stiffening ribs is maximized.

Typically said torsion member includes member side portions each adjacent a respective side edge portion.

Typically said stiffening ribs are located at about ⅓ and about ⅔ of the chord of the deck body at any given cross section.

Typically a transverse thickness and height of the stiffening ribs above the (inverted) bottom surface is selected to achieve the object of substantially flattening out a selected positive longitudinal camber in said body under a selected hypothetical user's weight.

Typically the amount of positive longitudinal camber is 25 mm (1") camber through the length of a 36" board.

Typically said top surface is of negative camber in its transverse section.

Typically said body is integrally formed of a polymer selected from one or more engineering polyolefins and the reinforcing is selected from one of more of a compatible fibre selected from glass fibre, carbon fibre or the like.

Typically the polymer matrix is polypropylene and the reinforcing is glass fibre.

Typically the polypropylene composition comprises from 20% to 40% by weight of glass fibre reinforcing.

Typically the composition comprises about 30% by weight of glass fibre reinforcing.

Typically said composition is produced from reinforcing beads comprising glass fibre and polypropylene, melt-compounded, extruded and granulated to form a pre-impregnated moulding composition, followed by further melt processing to an injectable composition.

Typically the injectable composition is delivered to a heated and cooled mould for high speed injection moulding.

Typically the injection moulding comprises a single shot, single gate injection moulding.

Typically the injection mould includes a single gate of about 20 mm.

In another broad form the present invention seeks to provide a method of forming a skateboard deck including the steps of:

providing a thermally controlled injection mould having a single gate and defining the shape of a body having top and bottom surfaces and including a pair of spaced truck attachment bases integrally formed on the bottom surface and each associated with a respective end of said body, a substantially closed-loop, integral torsion member formed on the bottom surface of the body in a space between said truck attachment bases, and a pair of longitudinal stiffening ribs each formed integrally with the body, said truck attachment bases and said torsion member, said stiffening ribs and body being positively cambered;

preparing an injection shot of fibre reinforced thermoplastic by a method comprising melt processing thermoplastic with reinforcing fibre to form a mixture, followed by one of more cycles of extruding, pelletizing and melt processing said mixture, and passing said injection shot to a single shot, high speed injector associated with said gate;

operating said injector to fill said mould;

cooling said mould to solidify said body; and ejecting said body from said mould.

Typically said injection shot comprises a polymer matrix of high quality polypropylene.

Typically said reinforcing fibre is glass fibre.

Typically said injection shot comprises from 20% to 40% by weight of glass fibre reinforcing.

Typically said injection shot comprises about 30% by weight of glass fibre reinforcing.

Typically the injection shot is produced from pre-wet fibreglass/polypropylene beads, melt-compounded with polypropylene, extruded and granulated to form a pre-impregnated moulding composition, followed by further melt processing to an injectable composition.

In yet another broad form the present invention seeks to provide a skateboard including:

a skateboard deck comprising an elongate, fibre-reinforced thermoplastic injection moulded body having top and bottom surfaces, a pair of spaced truck attachment bases integrally formed on the bottom surface and each associated with a respective end of said body, a substantially closed-loop, integral torsion member formed on the bottom surface of the body in a space between said truck attachment bases, and a pair of longitudinal stiffening ribs each formed integrally with the body, said truck attachment bases and said torsion member, said stiffening ribs and body being positively cambered whereby the body substantially flattens out under load in use; and a reverse king pin truck secured to each said truck attachment base.

BRIEF DESCRIPTION OF THE DRAWINGS

The invention will be described with reference to the following non-limiting embodiment of the invention as illustrated in the drawings and wherein.

In the figures there is provided a skateboard deck comprising an elongate, fibre-reinforced thermoplastic injection moulded body 10 having top 11 and bottom 12 surfaces. A pair of spaced truck attachment bases 13 is integrally formed on the bottom surface 12. A substantially closed-loop, integral torsion member 14 is formed on the bottom surface 12 of the body in a space between the truck attachment bases 13. A pair of longitudinal stiffening ribs 15 are each formed integrally with the body 10, the truck attachment bases 13 and the torsion member 14, the stiffening ribs 15 and body 10 being positively cambered whereby the body substantially flattens out under load in use.

In this embodiment the body 10 is 36" in length and has a 1" positive camber (hog) over its length.

The body 10 is bounded by a periphery 16 defining opposed side edge portions 17 of the deck interconnected at their ends by respective nose 20 and tail 21 portions. The nose 20 and tail 21 portions are of different shapes. The nose portion 20 is somewhat broader and blunter and overlies the inclined-king-pin truck 22. Accordingly the bottom surface 12 in the region of the nose portion 20 is relieved to form moulded-in wheel arches 23.

The truck attachment bases 13 provide a strong, level mounting surface for the trucks 22 to attach as well as providing a level surface for mounting. The bases 13 are built up and thickened relative to a standard board. This build up, in combination with the utilisation of reverse kingpin trucks 22, gives greater control to the rider, and provides extra strength and load bearing properties over the truck area, critical at the front of the board during downhill descents. The built-up bases 13 also maximized the integral cross section of attachment to the stiffening ribs 15.

The torsion member 14 includes member side portions 24 each adjacent a respective side edge portion 17. The torsion member 14 defines a recess 25 in the underside of the deck body 10, which recess represents a relatively thin portion of the deck, reducing weight. The side edge portions 24 or rails may also be relatively thin, cantilevered as they are from the reinforcing provided by the torsion member 14.

Figure 1:
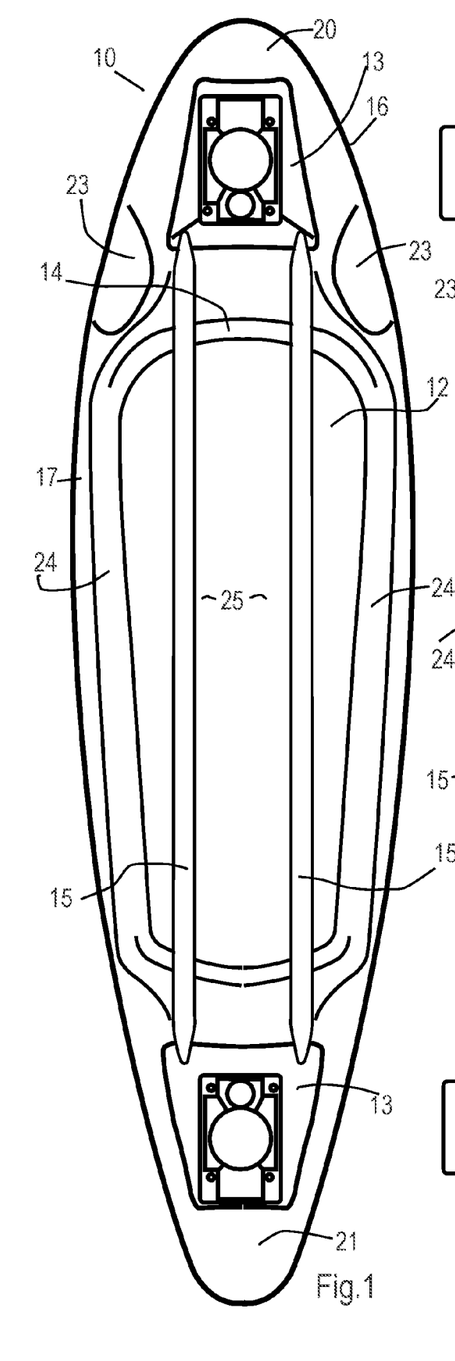
FIG. 1 is a bottom plan view of a skateboard deck in accordance with the present invention.
Figure 2:
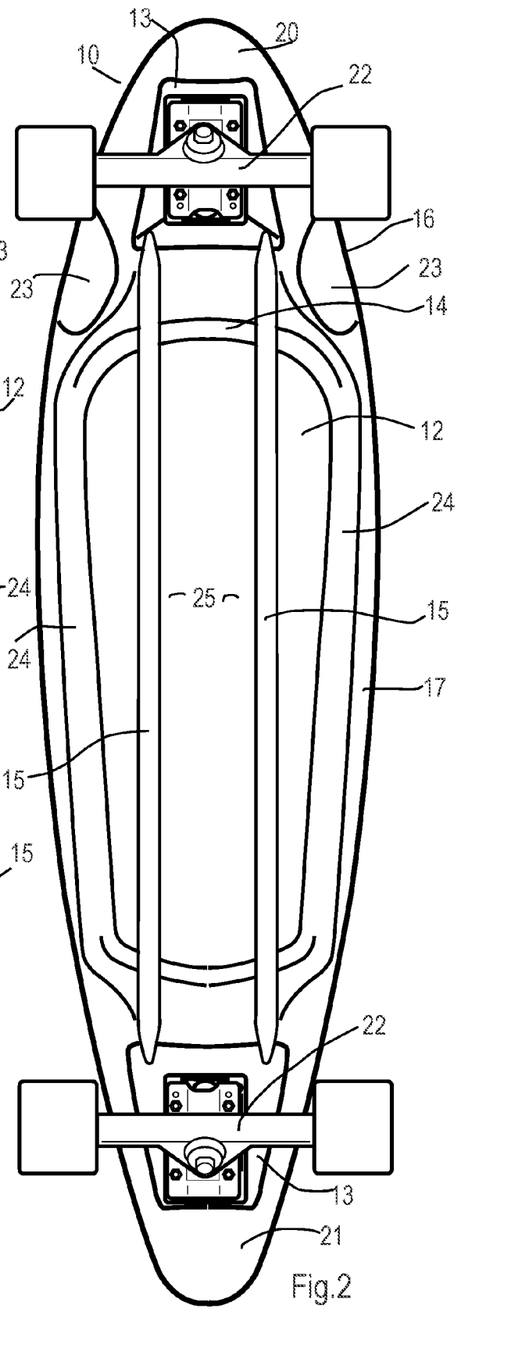
FIG. 2 is a bottom plan view of the deck of FIG. 1, trucks installed.
Figure 3:
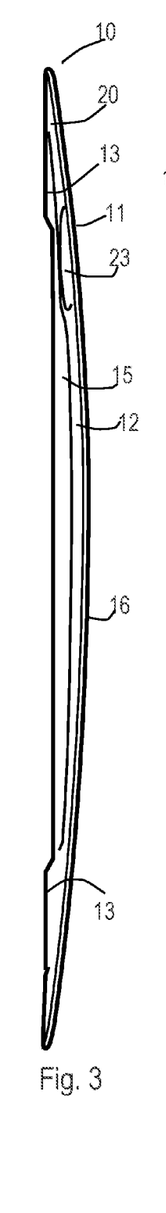
FIG. 3 is a left side view of the deck of FIG. 1.
Figure 4:
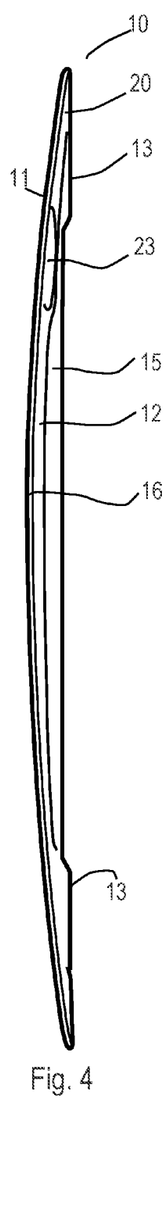
FIG. 4 is a right side view of the deck of FIG. 1.
Figures 5, 6:
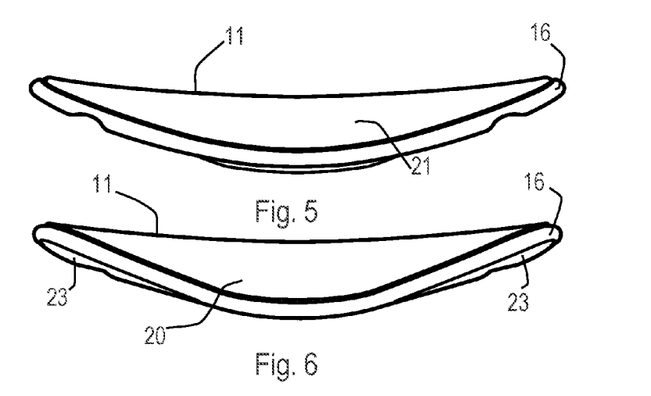
FIG. 5 is a front view of the deck of FIG. 1.
FIG. 6 is a rear view of the deck of FIG. 1.
Figure 7:
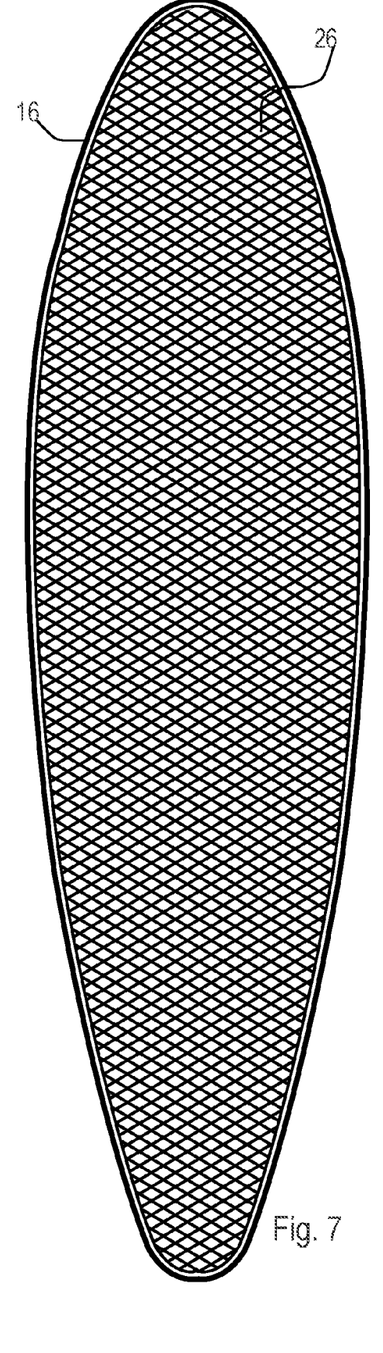
FIG. 7 is a top plan view of the deck of FIG. 1.
Figure 8:
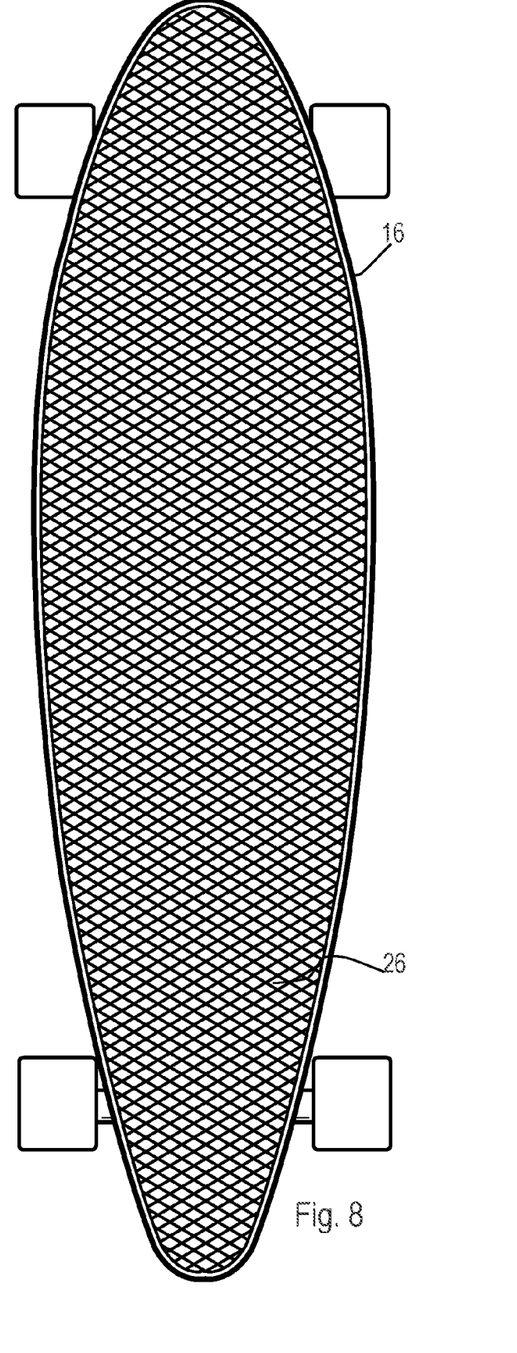
FIG. 8 is a top plan view of the deck of FIG. 1, trucks installed.
Figure 9:
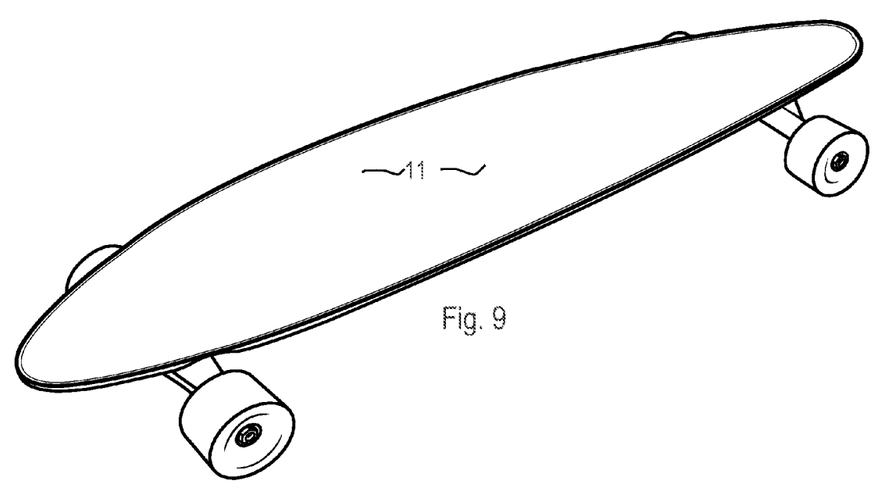
FIG. 9 is a top perspective view of a skateboard incorporating the deck of FIG. 1, grip omitted.
Figure 10:
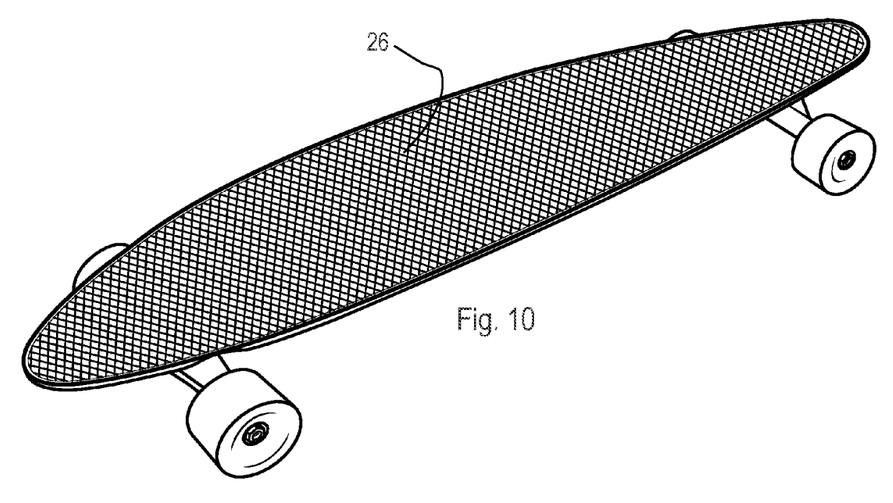
FIG. 10 is a top perspective view of a skateboard incorporating the deck of FIG. 1, grip indicated symbolically.
Figure 11:
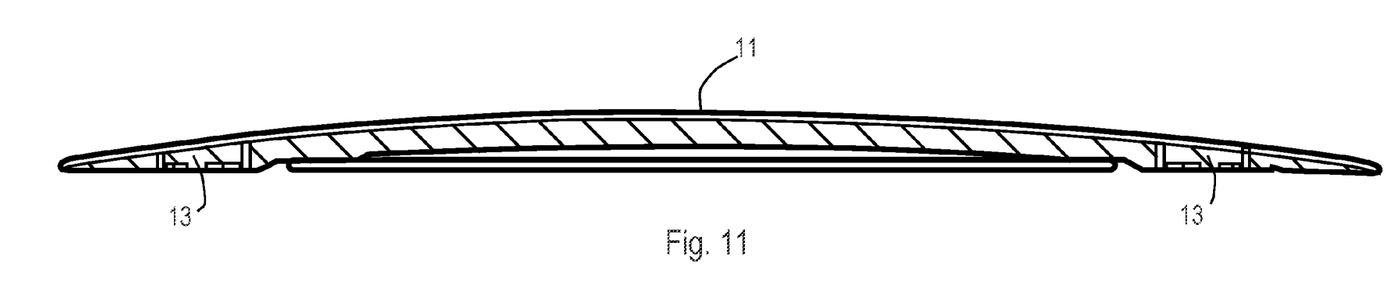
FIG. 11 is a longitudinal vertical section through the deck of FIG. 1.
Figure 12:
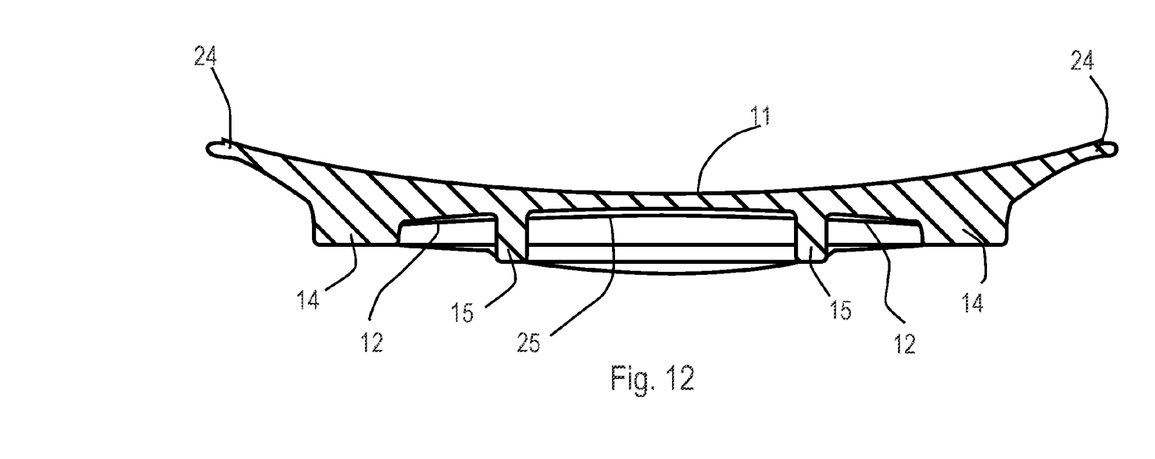
FIG. 12 is a transverse vertical section through the deck of FIG. 1.
Figure 13:
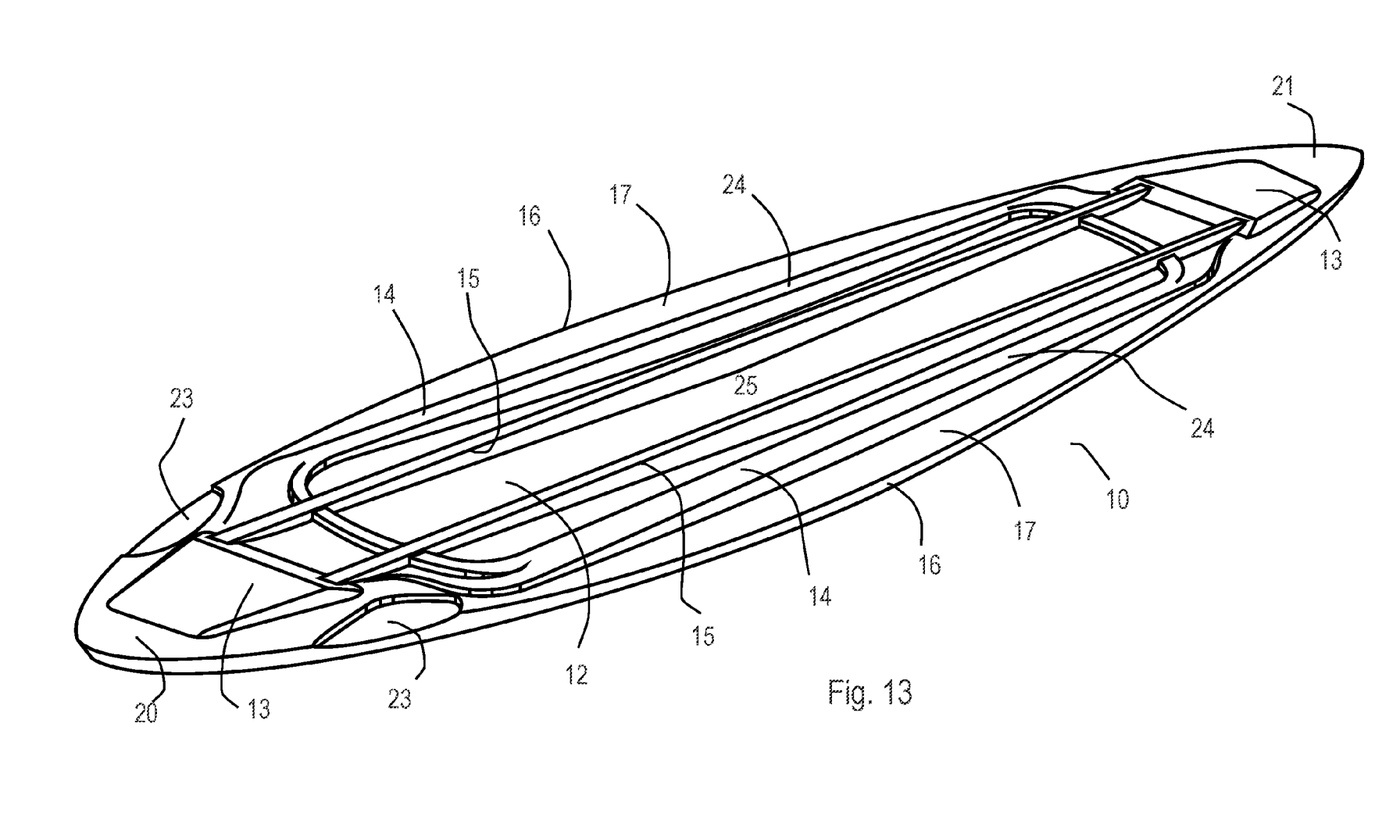
FIG. 13 is a bottom perspective view of the deck of FIG. 1.

The stiffening ribs 15 are located at about ⅓ and about ⅔ of the chord of the deck body 10 at the cross section of FIG. 12.

The top surface 11 of this embodiment is substantially flat longitudinally under load at the centreline and is provided with a non-slip coating 26. The body 10 does however have a negative camber through its transverse section at the top surface 11, elevating the rails 24 slightly above the top surface at the centreline The body 10 is composed of polypropylene that is combined with fiberglass and injected at pressure through a single heated injection channel. There is one 20 mm diameter circular injection gate that the composite material is injected through to fill the mould cavity. During initial development, the injection gate size was much smaller, however it was discovered that the amount of fiberglass in the mixture dramatically influenced the rate and consistency of flow, so the gates needed to be enlarged for optimal flow and uniformity of materials.

The key to achieving uniform composition of fiberglass throughout the longboard (giving it the required strength to avoid excessive sag) is the double mixing process. In the first instance the fiberglass material is granulized and mixed with the polypropylene in an initial heat. This allows for consistency throughout in both composition and colour. This "batch" is then set and the combined mixture is then granulized again. It is this granulized combination composite polypropylene that is then heated and used in the final injection moulding process into the longboard mould.

Currently, the composition of the injected mixture is 30% fibreglass, which has proved to be both high in strength as well as providing the optimal flex performance characteristics. Various experiments as well as mechanical tests were performed to arrive at this composition. At 30% the optimal characteristics of longboard are achieved in terms of flex and performance, without the polypropylene being compromised in form or in colour/aesthetics.

The main issue that created complications in the early stages of design and sampling was controlling flex, which was due to the large wheelbase (630 mm). This wheel base creates a significant platform of distance between the trucks 22, in the middle of the board 10, which has the highest load bearing requirement. Initially, 100% polypropylene samples were produced due to the great tensile strength, flexibility and abrasion resistance of polypropylene. However with such a large wheelbase, the board sagged severely when the rider would stand on the board, even at small weights. This had to be overcome by stiffening up the board. However as flex and spring are desirable, so different percentages of fiberglass were added to the mix to achieve this. It was during this process that the double heating/mixing process was developed to allow for uniform composition, which was hard to achieve from a one heat injection moulding process, where the fiberglass was mixing at a different rate under pressure, in different areas of the board.

However, after samples were produced with high percentages of fiberglass within the mixture, the large amount of unwanted sag was still not eliminated. A pair of integrally formed, spaced, substantially parallel stiffening ribs 15 extending along the underside of the board 10, and each extending substantially to the front and rear towards the truck base 13 were incorporated into the board.

By thickening up increasing the height and length of the stiffening ribs 15, taking them right up to the truck base 13 and in line with the wheel wells 23, the right amount of flex was created, which was the driving force of the boards performance, whilst maintaining a strong and rigid structure that sufficiently held the weight of the rider, and would perform under high impact air tricks. These ribs 15 now traverse the whole length of the wheel base.

By adding a 1" camber through the length of the board 10, the spring and flex becomes loaded once the rider places their weight on the board, causing the camber to become flattened out. The deck wants to spring back to the original shape once the camber is flattened with the rider's weight; this is utilized during cornering and carving. When entering a turn or corner, the direction of the load from the rider is magnified in specific areas causing further flex, which is then released when exiting the corner. This large amount of return-spring that occurs when the load of the rider is reduced whilst exiting the corner due to the rider changing from a crouched position to a standing position gives the performance enhancement of increased speed when leaving the corner. This is the driving force of the board's performance.

The thickness of the board was able to remain very thin (11 mm) on average because the strengthening members provided the needed strength without being cumbersome. Low weight means greater speed and faster response which are both important performance factors.

The plastic composite body of the deck also provided greater strength than standard timber decks as it has higher impact resistance and abrasion qualities which is one of the main causes of product degradation.

In one aspect the present invention resides broadly in a skateboard deck comprising an elongate, fibre-reinforced thermoplastic injection moulded body having top and bottom surfaces and including:
  a pair of spaced truck attachment bases integrally formed on the bottom surface and each associated with a respective end of said body;
  a substantially closed-loop, integral torsion member formed on the bottom surface of the body in a space between said truck attachment bases; and
  a pair of longitudinal stiffening ribs each formed integrally with the body, said truck attachment bases and said torsion member, said stiffening ribs and body being positively cambered whereby the body substantially flattens out under load in use.

The body may be of any selected skateboard dimensions as to length and width. However, the invention provides specific benefits for longboards and will be specifically described hereinafter with reference to boards of, for example 36" in length. The injection moulding of such boards presents particular issues.

In terms of material, while high quality polypropylene is suitable for standard boards, the bending forces in longboards precludes is use unless at the cost of excessive weight. It is envisaged that the polymer may be selected from engineering polyolefins and the reinforcing be selected from one of more of a compatible fibre such as glass, carbon or the like.

While there are many potential choices of fibre reinforcing for injection mouldable thermoplastics available to increase the modulus, it has been surprisingly determined that particular processing and compositional choices produce an improved result.

Specifically, from a materials point of view it is preferred that the polymer matrix be high quality polypropylene. It is further preferred that the reinforcing be fibreglass. In practice there are many compositions and processing conditions that that fall short in longboards. The polypropylene composition may comprise from 20% to 40% by weight glass fibre reinforcing. The preferred composition comprises about 30% by weight of glass fibre reinforcing.

In order that the consistency of the composition be uniform throughout the body, the injection shot is preferably produced from pre-wet fibreglass/polypropylene beads, double compounded with polypropylene stock. For example, reinforcing beads comprising glass fibre may be melt-compounded with polypropylene, extruded and granulated to form a pre-impregnated moulding composition, followed by further melt processing to an injectable composition.

The injectable composition is preferably delivered to a heated and cooled mould for high speed injection moulding. The injection moulding may comprise a single shot, single gate injection moulding. For example, the injection mould may include a single gate of about 20 mm to accommodate the preferred multiply-processed injectable composition of the invention.

The body may be bounded by a periphery defining opposed side edge portions of the deck interconnected at their ends by respective nose and tail portions. The nose and tail portions may be of the same shape or different shapes.

As is common in moulded boards of "SoCal"-like shapes, the nose and/or tail portion may require moulded-in wheel arch recesses, to accommodate the wheels in turns as the body rotates about the truck king pin.

The truck attachment bases provide a strong mounting surface for the trucks to attach as well as providing a level surface for mounting. The bases may be built up and thickened relative to a standard board. This build up, in combination with the utilization of reverse kingpin trucks, gives greater control to the rider, and provides extra strength and load bearing properties over the truck area, critical at the front of the board during downhill descents. The built-up bases also maximized the integral cross section of attachment to the stiffening ribs.

The torsion member may include member side portions each adjacent a respective side edge portion. The torsion member defines a recess in the underside of the deck body, which recess represents a relatively thin portion of the deck, reducing weight. The side edge portions or rails may also be relatively thin, cantilevered as they are from the reinforcing provided by the torsion member.

The stiffening ribs are preferably located at about ⅓ and about ⅔ of the chord of the deck body at any given cross section, approximately corresponding to the inner track dimensions of the truck, the width of the truck attachment base, and allowing the positioning of any necessary wheel wells. The length of the stiffening ribs is determined by the requirement that the ribs be integrated with each truck attachment base. However, the transverse thickness and height of the stiffening ribs above the (inverted) bottom surface may be determined empirically to achieve the object of substantially flattening out under the user's weight.

By thickening up and/or increasing the height of the stiffening ribs relative to a short board, and taking them right up to the truck base and in line with the wheel wells, the right amount of flex may be engineered in. For preference, the height of the ribs should not exceed the height of the truck bases, and may be less. Conversely, the thickness of the ribs should be the minimum necessary to maintain a strong and rigid structure that sufficiently holds the weight of the rider while reducing the longitudinal positive camber (or hog, as opposed to sag or rocker) to about zero, and would perform under high impact air tricks.

The amount of positive longitudinal camber or hog will be determined having regard to a selected design weight of a hypothetical user and the spring constant inherent in the deck. Typically, a 25 mm (1") camber through the length of a 36" board should be aimed for, the spring and flex becoming loaded once the rider places their weight on the board, causing the camber to become flattened out. The deck wants to spring back to the original shape once the camber is flattened with the rider's weight; this is utilized during cornering and carving.

When entering a turn or corner, the direction of the load from the rider is magnified in specific areas causing further flex, which is then released when exiting the corner. This large amount of return-spring that occurs when the load of the rider is reduced whilst exiting the corner due to the rider changing from a crouched position to a standing position gives the performance enhancement of increased speed when leaving the corner. This is the driving force of the present board's performance.

The top surface may be substantially flat or may be of a dished configuration. For example, the body may be of negative camber through its transverse section at the upper surface, elevating the rails slightly above the upper surface at the centerline. The body may be consistently or variably curved at the upper surface. For example the rear portion of the upper surface may be a shallow bowl relative to the rest of the upper surface.

In a further aspect this invention resides broadly in a method of forming a skateboard deck including the steps of:
providing a thermally controlled injection mould having a single gate and defining the shape of a body having top and bottom surfaces and including a pair of spaced truck attachment bases integrally formed on the bottom surface and each associated with a respective end of said body, a substantially closed-loop, integral torsion member formed on the bottom surface of the body in a space between said truck attachment bases, and a pair of longitudinal stiffening ribs each formed integrally with the body, said truck attachment bases and said torsion member, said stiffening ribs and body being positively cambered;
preparing an injection shot of fibre reinforced thermoplastic by a method comprising melt processing thermoplastic with reinforcing fibre to form a mixture, followed by one of more cycles of extruding, pelletizing and melt processing said mixture, and passing said injection shot to a single shot, high speed injector associated with said gate;
operating said injector to fill said mould;
cooling said mould to solidify said body; and
ejecting said body from said mould.

The injection shot may comprise a polymer matrix of high quality polypropylene. The reinforcing fibre may be glass fibre. The polypropylene composition may comprise from 20% to 40% by weight glass fibre reinforcing. The preferred composition comprises about 30% by weight of glass fibre reinforcing.

The injection shot may be produced from pre-wet fibreglass/polypropylene beads, compounded with polypropylene stock moulding granules. For example, reinforcing beads comprising glass fibre may be melt-compounded with polypropylene, extruded and granulated to form a pre-impregnated moulding composition, followed by further melt processing to the injectable composition.

In a yet further embodiment the present invention resides broadly in a skateboard including:
a skateboard deck comprising an elongate, fibre-reinforced thermoplastic injection moulded body having top and bottom surfaces, a pair of spaced truck attachment bases integrally formed on the bottom surface and each associated with a respective end of said body, a substantially closed-loop, integral torsion member formed on the bottom surface of the body in a space between said truck attachment bases, and a pair of longitudinal stiffening ribs each formed integrally with the body, said truck attachment bases and said torsion member, said stiffening ribs and body being positively cambered whereby the body substantially flattens out under load in use; and
a reverse king pin truck secured to each said truck attachment base.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:
1. A skateboard deck comprising an elongate, fibre-reinforced thermoplastic injection moulded body having top and bottom surfaces and including:

a pair of spaced truck attachment bases integrally formed on the bottom surface and each associated with a respective end of said body;

a substantially closed-loop, integral torsion member formed on the bottom surface of the body in a space between said truck attachment bases, wherein said body is bounded by a periphery defining opposed side edge portions of the deck interconnected at their ends by respective nose and tail portions, and said torsion member includes member side portions each adjacent a respective side edge portion; and a pair of longitudinal stiffening ribs each formed integrally with the body, said truck attachment bases and said torsion member, said stiffening ribs and body being positively cambered whereby the body substantially flattens out under load in use.

2. The skateboard deck according to claim 1, wherein said body is at least 36" in length.

3. The skateboard deck according to claim 1, wherein at least one of:
said nose and tail portions are of different shapes; and
said nose portion has moulded-in wheel arch recesses, to accommodate the wheels in turns as the body rotates about a truck king pin.

4. The skateboard deck according to claim 1, wherein at least one of:
said truck attachment bases are built up and thickened, whereby an integral cross section of attachment to the stiffening ribs is maximized; and
said top surface is of negative camber in its transverse section.

5. The skateboard deck according to claim 1, wherein said stiffening ribs are located at about ⅓ and about ⅔ of the chord of the deck body at any given cross section.

6. The skateboard deck according to claim 5, wherein a transverse thickness and height of the stiffening ribs above the (inverted) bottom surface is selected to achieve the object of substantially flattening out a selected positive longitudinal camber in said body under a user's weight.

7. The skateboard deck according to claim 6, wherein the amount of positive longitudinal camber is 25 mm (1") camber through the length of a 36" board.

8. The skateboard deck according to claim 1, wherein said body is integrally formed of a polymer selected from one or more engineering polyolefins and the reinforcing is selected from one of more of a compatible fibre selected from glass fibre, carbon fibre.

9. The skateboard deck according to claim 8, wherein the polymer matrix is polypropylene and the reinforcing is glass fibre.

10. The skateboard deck according to claim 9, wherein at least one of:
the polypropylene composition comprises from 20% to 40% by weight of glass fibre reinforcing; and
the polypropylene composition comprises about 30% by weight of glass fibre reinforcing.

11. The skateboard deck according to claim 8, wherein said composition is produced from reinforcing beads comprising glass fibre and polypropylene, melt-compounded, extruded and granulated to form a pre-impregnated moulding composition, followed by further melt processing to an injectable composition.

12. The skateboard deck according to claim 11, wherein the injectable composition is delivered to a heated and cooled mould for high speed injection moulding.

13. The skateboard deck according to claim 12, wherein at least one of:

the injection moulding comprises a single shot, single gate injection moulding; and
the injection mould includes a single gate of about 20 mm.

14. A method of forming a skateboard deck including the steps of:
providing a thermally controlled injection mould having a single gate and defining the shape of a body having top and bottom surfaces and including a pair of spaced truck attachment bases integrally formed on the bottom surface and each associated with a respective end of said body, a substantially closed-loop, integral torsion member formed on the bottom surface of the body in a space between said truck attachment bases, and a pair of longitudinal stiffening ribs each formed integrally with the body, said truck attachment bases and said torsion member, said stiffening ribs and body being positively cambered;
preparing an injection shot of fibre reinforced thermoplastic by a method comprising melt processing thermoplastic with reinforcing fibre to form a mixture, followed by one of more cycles of extruding, pelletizing and melt processing said mixture, and passing said injection shot to a single shot, high speed injector associated with said gate;
operating said injector to fill said mould;
cooling said mould to solidify said body; and
ejecting said body from said mould.

15. The method of forming a skateboard deck according to claim 14, wherein said injection shot comprises a polymer matrix of high quality polypropylene.

16. The method of forming a skateboard deck according to claim 15, wherein said reinforcing fibre is glass fibre.

17. The method of forming a skateboard deck according to claim 16, wherein at least one of:
said injection shot comprises from 20% to 40% by weight of glass fibre reinforcing; and
said injection shot comprises about 30% by weight of glass fibre reinforcing.

18. The method of forming a skateboard deck according to claim 14, wherein the injection shot is produced from pre-wet fibreglass/polypropylene beads, melt-compounded with polypropylene, extruded and granulated to form a pre-impregnated moulding composition, followed by further melt processing to an injectable composition.

19. A skateboard including:
a skateboard deck comprising an elongate, fibre-reinforced thermoplastic injection moulded body having top and bottom surfaces, a pair of spaced truck attachment bases integrally formed on the bottom surface and each associated with a respective end of said body, a substantially closed-loop, integral torsion member formed on the bottom surface of the body in a space between said truck attachment bases, wherein said body is bounded by a periphery defining opposed side edge portions of the deck interconnected at their ends by respective nose and tail portions, and said torsion member includes member side portions each adjacent a respective side edge portion, and a pair of longitudinal stiffening ribs each formed integrally with the body, said truck attachment bases and said torsion member, said stiffening ribs and body being positively cambered whereby the body substantially flattens out under load in use; and
a reverse king pin truck secured to each said truck attachment base.

* * * * *